INVENTOR
L.C. THOMAS
BY John K. Mullarney
ATTORNEY 3,534,273

AUTOMATIC THRESHOLD LEVEL SELECTION AND EYE TRACKING IN DIGITAL TRANSMISSION SYSTEMS

Lewis C. Thomas, North Plainfield, N.J., assignor to Bell Telephone Laboratories, Incorporated, Murray Hill, N.J., a corporation of New York Filed Dec. 18, 1967, Ser. No. 691,526
Int. Cl. H03k 5/00
U.S. Cl. 328—162 7 Claims

ABSTRACT OF THE DISCLOSURE

This disclosure relates to apparatus for automatically selecting optimum voltage threshold decision levels and sampling times for minimum-error code interpretation in a multilevel digital data transmission system. This is accomplished by determining the boundaries of so-called "signal-eyes" which are defined by the ensemble of all possible digital code combinations at a code interpretation point. In brief, the maximum eye openings along the voltage axis are determined, the voltage threshold levels set midway between the extremes of these opnings, and the sampling times adjusted to coincide with the maximum openings.

BACKGROUND OF THE INVENTION

This invention relates to digital data transmission systems and more particularly to receiver apparatus for automatically selecting optimum voltage threshold levels and sampling times for minimum-error code detection.

In digital data transmission systems it is necessary to establish voltage thresholds so as to reliably distinguish between the possible levels of the incoming digital data. Further, for minimum-error code detection, it is essential that the sampling times be optimized to the extent possible. In certain data transmission systems, such as those using a coaxial cable for transmission purposes, fixed voltage thresholds and fixed sampling times can be utilized. The transmission medium is, in this case, well controlled and the data signals experience little if any distortion.

In other data transmission systems, such as those using radio relay links as the transmission media, transmission impairment is often experienced due, for example, to signal fading of a selective nature. The technique of choosing fixed thresholds and fixed sampling instants for code detection typically results, in this case, in unnecessarily high error rates even though the choice for average transmission conditions has been optimized. For the latter data transmission systems, a lower bit error rate should be realized if the voltage thresholds and sampling times are varied so as to continuously and automatically compensate for signal waveform distortion.

SUMMARY OF THE INVENTION

It is an object of the present invention therefore to reduce decoding errors which occur due to transmission impairments of a uncontrollable and often unpredictable nature.

It is a further object of the invention to optimize the placement of voltage thresholds and sampling times for reduced error code detection in the presence of varying distortions.

The present invntion addresses itself to the problem of proper placement of voltage thresholds and the suitable selection of sampling times with respect to so-called "signal-eyes" of changing dimensions and changing positions. The signal-eyes are of the type produced by the ensemble of all signal waveforms of a digital data system at the code interpretation point. The inventive technique advantageously utilized herein concentrates upon determining the boundaries of the signal-eyes composed of all possible digital code comibnations. In brief, the maximum eye openings along the voltage axis are determined, the voltage threshold levels set midway between the extremes of these openings, and the sampling times adjusted to coincide with the maximum openings. This technique is applicable to any multilevel digital signal transmission system, e.g. binary and quaternary signal systems.

DETAILED DESCRIPTION

Figure 1:
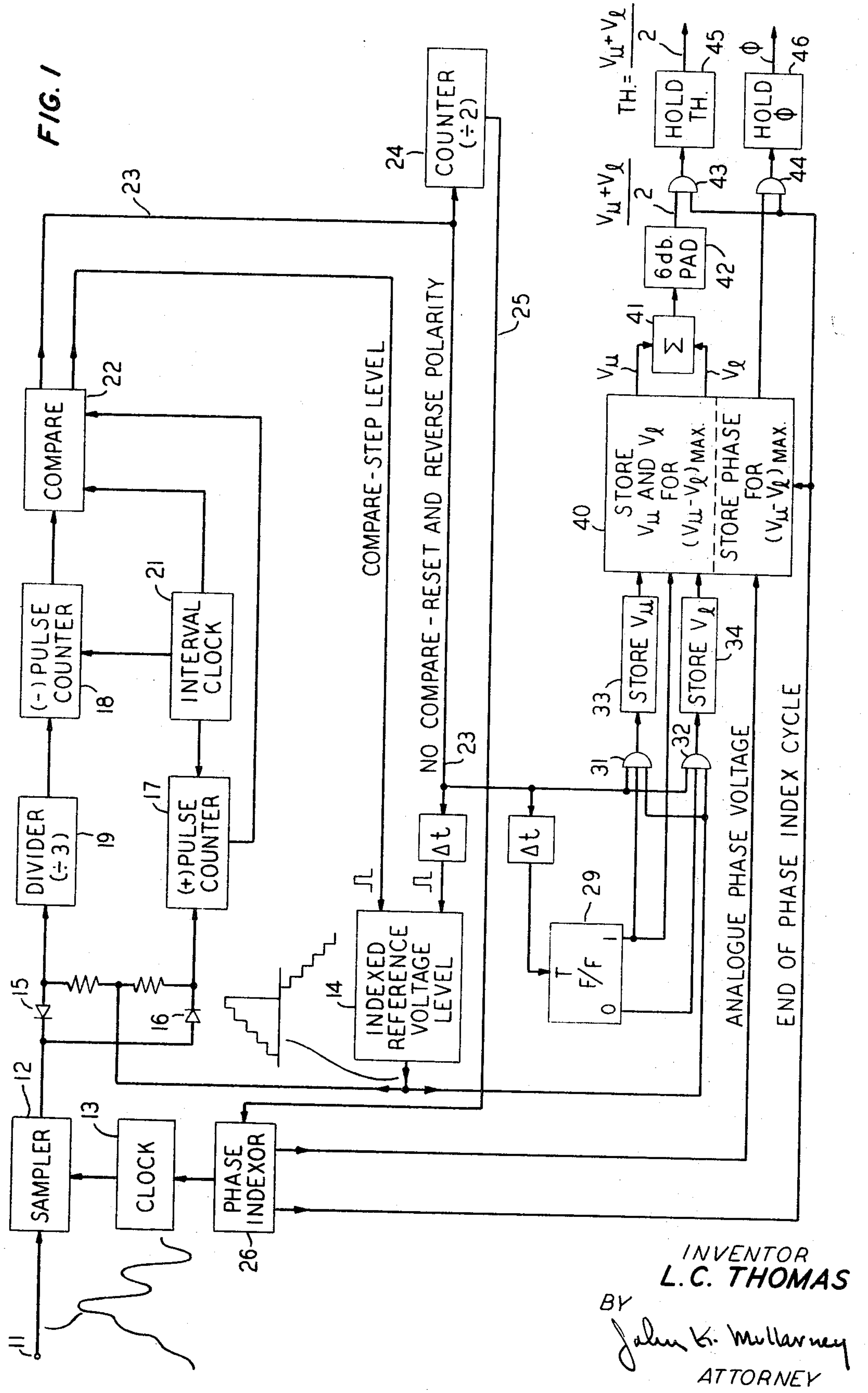
FIG. 1 illustrates a simplified schematic block diagram of threshold level selection and eye tracking apparatus in accordance with the principles of the present invention.
Figure 4A:
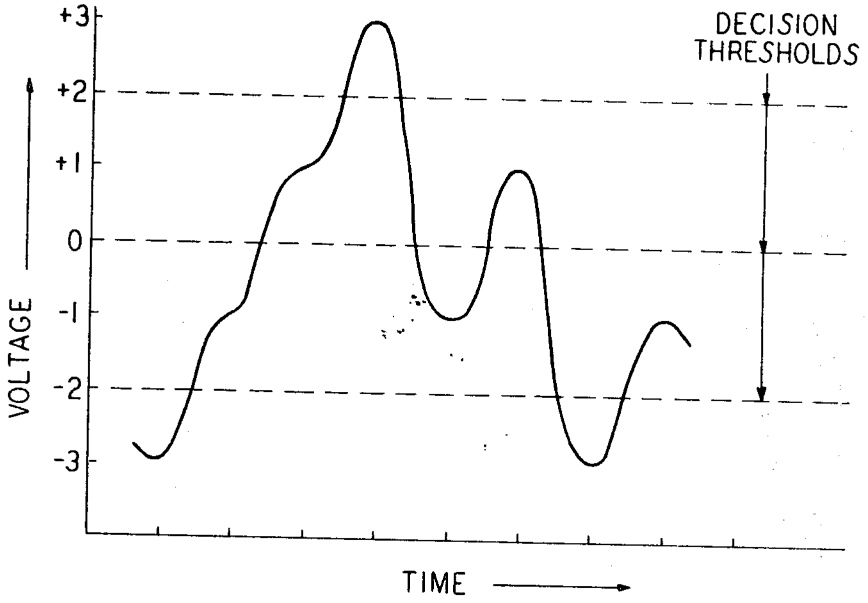
FIG. 4A illustrates a typical quaternary digital data signal.

Turning now to FIG. 1 of the drawings, a multilevel digital data signal, in this case a quaternary signal, is coupled to the input terminal 11 of the threshold level selection and eye tracking apparatus of the invention. A typical quaternary signal is shown in FIG. 4A, and it consists of four possible coded levels, i.e., $\pm 1$ and $\pm 3$ volts. To distinguish between the four possible levels, it is necessary to establish three decision threshold levels, as indicated in FIG. 4A.

The decision threshold levels, as well as optimum sampling times, are arrived at by examining the boundaries of the so-called signal-eyes. The signal-eyes and eye boundaries are defined by the ensemble of all possible digital coded signals; it is apparent, therefore, that an eye exists not at any one instant of time, but over a sufficiently long period for all the possible digital code combinations to occur.

Figure 4B:
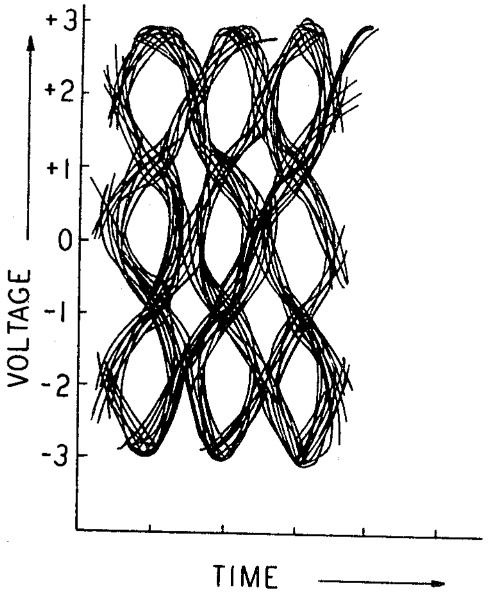
FIG. 4B shows typical signal-eyes produced by the ensemble of the signal waveforms of a quaternary digital data system at the code interpretation point.

If a portion of the quaternary signal of FIG. 4A was displayed on the face of a long persistence cathode ray oscilloscope and successive incoming digital data superimposed thereon, an eye pattern such as that shown in FIG. 4B would result. The signal-eye distortions are somewhat exaggerated here for illustrative purposes. For the assumed quaternary signal, three vertically disposed signal-eyes would thus be formed for each time slot. It will be clear to those skilled in the art that the signal eyes are not static or stationary, but rather they are of changing dimensions and changing positions in the voltage-time domain. And these eye changes are absolute as well as relative to each other. For a further discussion of signal-eyes and eye distortion see "Data Transmission" by W. R. Bennett and J. R. Davey, McGraw-Hill Book Co. (1965), pages 118–121.

The principles of the present invention are applicable to any multilevel digital data system. For example, in a binary or two level digital data transmission arrangement a single eye is formed per time slot and the apparatus of the invention examines this eye, in the manner to be described, to arrive at optimum threshold levels and sampling times therefor. For the assumed quaternary case, each of the three vertically disposed signal-eyes is examined independently and distinct threshold levels and sampling times for each are arrived at. The operative procedure to be described is exactly the same for even higher order multilevel digital data signals. Accordingly, it is to be understood that the expression multilevel digital data signals has reference to all data signals of two or more coded levels.

Figure 3:
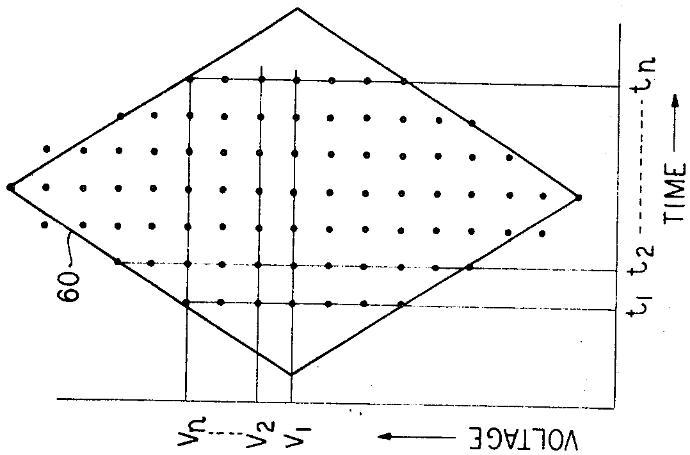
FIG. 3 is a symbolic diagram that facilitates explanation of the present invention.

The manner of determining the signal-eye boundaries can be readily appreciated by reference to FIG. 3 wherein a signal-eye is symbolically illustrated by the diamond-shaped figure 60. The incoming digital data signal is successively sampled at a given instant in each time slot (e.g. at time $t_1$) and the samples compared with a reference voltage (e.g. voltage $V_1$). This reference voltage is then successively increased in quantum steps ($V_1, V_2 \ldots V_n$) in response to the comparison until the reference voltage approximates the upper eye boundary. With the upper eye boundary thus established for time $t_1$, the reference voltage level is reset to its initial value of $V_1$ and then successively incremented, in quantum steps, in the negative-going direction until the lower eye boundary is approximated. In this fashion the upper and lower eye boundaries are determined for time $t_1$. The sampling time is then incremented a given amount to time $t_2$ and the abovedescribed process is repeated.

With the upper and lower eye boundaries established as described for each of the times $t_1, t_2 \ldots t_n$, the significant portion of the signal-eye has been effectively delineated and the optimum threshold voltage level and sampling time therefor can be readily arrived at. Specifically, the maximum eye opening along the voltage axis can now be readily ascertained, the voltage threshold level set midway between the extremes of the eye opening, and the code interpretation sampling time adjusted to coincide with the maximum opening.

In FIG. 3, the vertical columns of dots represent sampling times or instants, while the horizontal rows of dots represent incremental values of the comparison reference voltage. The extent to which the reference voltage ($V_1, V_2 \ldots V_n$) and the sampling instant ($t_1, t_2 \ldots t_n$) are incremented each time depends, of course, on various factors such as the anticipated changes in the signal-eye dimensions and relative positions. Also, the accuracy with which one wishes to determine the eye boundaries is, of course, significant. For increased accuracy, smaller quantum increments in reference voltage and sampling time are desirable. The reference voltage and sampling time increments are thus within the discretion of the circuit designer and the invention is in no way limited to particular incremental values therefor.

Returning now to FIG. 1, the incoming multilevel digital data signal is sampled in the sampler 12 which is under control of the clock 13. The clock 13 will be described in greater detail hereinafter; for the present it is sufficient to note that the clock is "slaved" or locked to the average phase of the incoming digital data stream. Such a slaving is adequate to compensate for a flat envelope delay but will not compensate for linear, parabolic or higher order delay distortions. The sampler 12 successively samples the digital data at an initial predetermined instant in each time slot (e.g. time $t_1$ in FIG. 3) and the PAM samples are then compared with a reference voltage derived from the indexed reference voltage level circuit 14. As will be evident hereinafter, the initial value for this comparison reference voltage can be a fixed long term average one, or alternatively, it can be a continually adjusted value which corresponds to the threshold voltage (TH.) derived in the manner to be described.

The comparison operation is essentially a counting one. Functionally, the circuitry counts the number of PAM samples that exceed the reference voltage during a given interval and compares this count with the number of samples below said reference voltage in the same interval. These counts are then used to decide whether or not the reference voltage should be incremented a quantum step. For example, the most positive eye of a 4-level quaternary data signal should typically have about 25% of the PAM signal amplitudes above the reference voltage value (e.g. $V_1$ of FIG. 3) and about 75% below (i.e. on the average there should be a 1:3 ratio, one upper coded level of +3 volts for every three of the other levels). The reference voltage is successively incremented in quantum steps until this ratio is violated. Since experiments have shown that error rates break quickly to large values as the threshold approaches the eye boundaries, the 1:3 ratio is also disrupted suddenly as the reference voltage approximates the eye boundaries.

The aforementioned voltage comparison is carried out by means of diodes 15 and 16. If a PAM sample exceeds (i.e. is more positive than) the reference voltage level a pulse signal is coupled to the input of the positive pulse counter 17 via diode 16; whereas, if the PAM sample is more negative than the reference voltage, a pulse signal is coupled to the input of the negative pulse counter 18 via the diode 15 and the divider 19. FIG. 1 shows the circuit arrangement for the upper or most positive eye of a 4-level quaternary data system. Accordingly, to offset for the 1:3 ratio discussed above, the divider 19 is used to divide by three the pulses directed to counter 18. For examination of the lower eye, the (÷3) divider 19 would be associated with the (+) pulse counter 17, and for the intermediate eye no such divider is necessary.

In general, for systems having $N+1$ levels, a divide by N circuit replaces divider 19 for the uppermost eye; a divide by $N-1$ for the second highest eye and so forth until the central eye is encountered which, as has been stated, would require no divider. Eyes at voltage levels below that of the central eye would have appropriate dividers associated with the + pulse counter 17 in a manner similar to that described for the upper eyes.

The pulse counters 17 and 18 are energized or enabled for a time interval determined by the interval clock 21. This time interval should be sufficiently long that all possible digital code combinations have a high probability of occurrence. After the aforementioned time interval has timed-out, the interval clock 21 delivers a short duration enabling signal to the compare circuit 22 for the purpose of comparing the counts in counters 17 and 18.

Within statistically acceptable variations the counts in the counters 17 and 18 should be substantially the same until the reference voltage level is incremented to a value which approximates the voltage of the upper eye boundary. In response to a close count-comparison the compare circuit 2 delivers an enabling pulse to the indexed reference voltage level circuit 14 to increment or step the level thereof one quantum step. The PAM samples derived from sampler 12 are then compared with this new reference voltage and new counts are accumulated in the counters 17 and 17 for the time interval set by interval clock 21. The pulse counters 17 and 18 are, of course, reset prior to this new count by a reset signal derived from the interval clock 21.

The above process is repeated and the reference voltage level successively incremented as described until it approximates the upper eye boundary. At this point the count of counter 18 will abruptly and significantly predominate over that of counter 17 and, in response thereto, the compare circuit 22 will generate a pulse signal over lead 23. This pulse signal is coupled to the counter 24, for a purpose to be described, and also to the reference voltage level circuit 14 via a short delay. The pulse resets the reference voltage level to its initial value (e.g. $V_1$) and readies the reference voltage level circuit 14 to incrementally step in a negative-going direction. The count comparison operation is then repeated with the reference voltage level successively incremented, in quantum steps, in the negative-going direction until the lower eye boundary is approximated. At this point count comparison is lost once again, with the count in counter 17 now predominating over that of counter 18. In response to this loss of count comparison, the compare circuit 22 again generates an output pulse which is coupled via lead 23 to the counter 24 and via the short delay to the reference voltage level circuit 14. The latter circuit is thereby reset and readied once again to incrementally step in the positive-going direction.

The upper and lower eye boundaries are thus established for the initial time slot sampling instant (e.g. time $t_1$). The sampling instant is then incremented a selected amount to time $t_2$ and the above-described process is repeated for this new sampling time. To this end, it will be recalled that a pulse is delivered to the counter 24 when the upper and then lower eye boundaries are each approximated. The counter 24 is a conventional scale-of-two counter that counts to two and then recycles. Counter 24 serves to deliver an output pulse to the lead 25, as it registers a two-count, and the same is coupled to the phase indexor 26 for the purpose of indexing or incrementing the sampling time a preselected amount.

The phase indexor 26 can comprise a conventional ring counter whose state or count is sequenced in a step-like manner in response to successive input pulses from counter 24, a process which results in automatically recycling after a predetermined number of steps have been traversed. The clock 13 comprises a multiphased oscillator, a gating circuit which serves as a phase selector, and an output pulse shaping circuit. As the state of the phase indexor 26 is successively sequenced, enabling pulses are delivered sequentially to the gating circuit of the clock 13 so as to select successive phases of the multiphased oscillator for delivery to the pulse shaper. In this manner, sampling pulses at incrementally phase shifted times $t_1$, $t_2$ . . . $t_n$ are successively developed in response to successive pulses from counter 24.

The indexed reference voltage circuit 14 can be similar in nature to the comparison reference-voltage generating circuitry found in PCM encoders. Typically, it may comprise a reference generating resistance network having a plurality of resistance branches equal in number to the number of quantum levels desired. The resistances here are respectively weighted $R/1$, $R/2$, $R/3$ et cetera, and hence the current flow in each branch is the reciprocal of the resistance thereof. A shift register or ring counter serves to respectively connect the resistance branches, in succession, to a constant current voltage source in response to successive index or increment pulses from the compare circuit 22. An when an eye boundary has been approximated as described, the compare circuit 22 delivers a pulse over lead 23 which resets the shift register or ring counter and reverses the polarity of the voltage source. The operation is then repeated until the opposite eye boundary is approximated, at which time the reference voltage circuit 14 is again reset and readied to step incrementally in the opposite direction—and so on.

The flip-flop 29 is initially in its "1" state; the AND gate 31, connected to the (1) output lead of the flip-flop, is so enabled, while the AND gate 32, connected to the (0) output lead, is temporarily disabled. The lead 23 is connected to the input of AND gates 31 and 32 as is the output of the indexed reference voltage circuit 14. When an upper eye boundary has been approximated as described, the compare circuit 22 generates a pulse signal over lead 23 which, in addition to resetting the indexed reference voltage circuit 14 after a short delay, acts to enable the AND gates 31 and 32. The AND gate 31 is thus fully enabled and the reference voltage ($V_u$), which approximates the upper eye boundary, is read into the STORE 33. The AND gate 32 is not fully enabled at this time. The indexed reference voltage circuit 14 is now reset and the flip-flop 29 "toggled" to its "0" state. The short delays $\Delta t$ insure that the latter operations take place after storage of the reference voltage $V_u$.

The reference voltage level is next indexed or incremented in the negative-going direction until the lower eye boundary is approximated. The AND gate 32 is fully enabled at this time and the reference voltage ($V_l$), corresponding to the lower eye boundary, is therefore read into STORE 34. The indexed reference voltage circuit 14 is then reset, once again, and the flip-flop 29 returned to its "1" state, both after a short delay. In this fashion, the voltage levels corresponding to the upper and lower eye boundaries are stored in STORES 33 and 34, respectively. The storage operation is a destructive one, i.e., the storage of new information destroys that previously stored. Accordingly, as the upper and lower eye boundaries are established for each of the sampling times $t_1$, $t_2$ . . . $t_n$ the referenced voltage values corresponding thereto are successively stored in STORES 33 and 34.

The eye boundary voltage and phase voltage storage means 40 serves to algebraically subtract the voltage of each lower eye boundary from that of the upper boundary for each of the sampling times $t_1$, $t_2$ . . . $t_n$. It then compares the results of successive subtractions so as to arrive at the maximum value therefore; i.e., it determines $(V_u-V_l)_{max}$. This, of course, is the value of the maximum eye opening along the voltage axis. The upper eye boundary voltage $V_u$, the lower eye boundary voltage $V_l$, and the clock phase, all corresponding to $(V_u-V_l)_{max}$ are then respectively stored. This clock phase is represented by an analogue voltage.

The storage circuitry 40 will be described in detail hereinafter.

The voltages $V_u$ and $V_l$, corresponding to the maximum eye opening, are summed in summing amplifier 41 and halved in the 6db. pad 42 to produce the automatically adjusted threshold voltage $(V_u+V_l)/2$. It will be apparent that this threshold value lies midway between the extremes of the maximum eye opening.

At the completion of a phase index cycle, the state of the phase indexer 26 is recycled as described so that the digital data is once again sampled at the time $t_1$. The phase indexer delivers an enabling pulse at this time to the AND gate 43 and 44. Accordingly, the new threshold voltage, midway between the extremes of the maximum eye opening, and the new phase (i.e. sampling time), coincident with the instant of maximum eye opening, are respectively stored in the HOLD circuits 45 and 46. From HOLD circuits 45 and 46 the new threshold and phase values are coupled to the sampling apparatus (not shown) at the digital data code interpretation point.

The write-in to HOLD circuits 45 and 46 can be a destructive one or, alternatively, the HOLD circuits can be cleared of old information just prior to a new write-in. To this end, the enabling pulse from phase indexer 26 can be coupled as a "clear" pulse to the HOLD circuits 45 and 46 just prior to the enabling of AND gates 43 and 44. For this purpose a short delay $\Delta t$ can be placed in the input path to AND gates 43 and 44.

Figure 2:
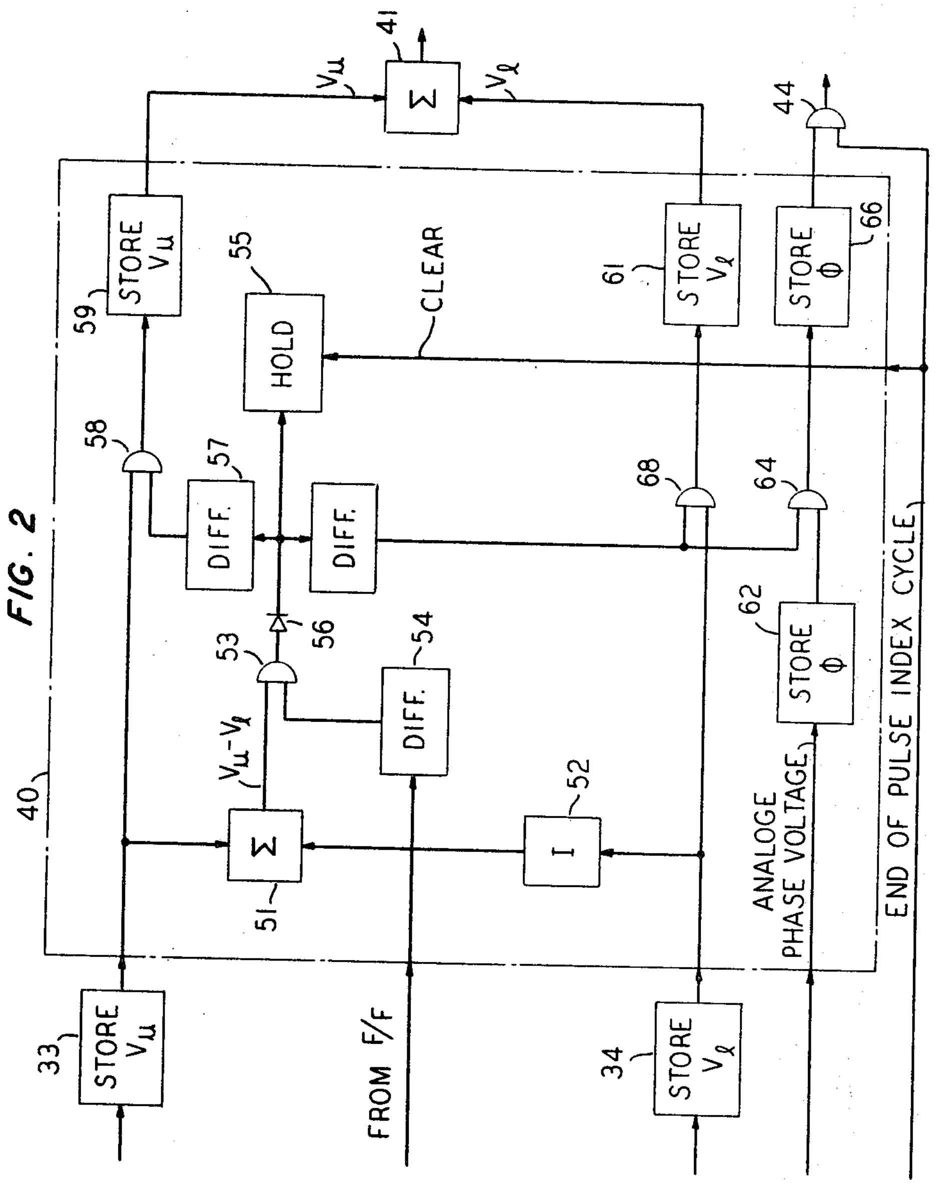
FIG. 2 is a detailed schematic diagram of the eye boundary voltage and phase voltage storage means of FIG. 1.

As previously stated, the storage circuitry 40, shown in detail in FIG. 2, serves to algebraically subtract the voltage of each lower eye boundary from that of the upper boundary for each of the sampling times $t_1$, $t_2$ . . . $t_n$. The voltage $V_u$ in STORE 33 is coupled directly to the summing amplified 51 while the voltage $V_l$ in STORE 34 is first inverted in inverter 52 and then coupled to the other input of the summing amplifier. The output of the summing amplifier 51 therefore comprises the algebraically subtracted value of $V_u-V_l$.

The storage circuitry 40 then compares the results of successive subtractions so as to arrive at the maximum value therefore, i.e., $(V_u-V_l)_{max}$. To this end, the successively derived values of $V_u-V_l$ are coupled to the input of AND gate 53. Now it will be recalled that subsequently to the storage of a lower eye boundary voltage $V_l$ in STORE 34, the flip-flop 29 is reset to its "1" state. If the signal on the (1) output lead of the flip-flop is, therefore, differentiated in the differentiator 54, the AND gate 53 will be enabled shortly after each now value of $V_u-V_l$ is developed.

With the HOLD 55 assumed cleared, the initial value of $V_u-V_l$ (i.e. for time $t_1$) is delivered to HOLD 55, via diode 56, where it is temporarily stored. As successive values of the voltage $V_u-V_l$ are coupled to the anode of diode 56 they will be read into HOLD 55 if, but only if, they exceed the previously stored value. When the maximum value of $V_u - V_l$ has been so stored the diode 56 is thereafter back-biased and it remains so until the HOLD 55 is cleared in preparation for a new compare operation.

For each value of $V_u - V_l$ passed by diode 56, the differentiator 57 develops a short duration pulse which temporarily enables AND gate 58. It will be apparent therefore that the upper eye boundary voltage corresponding to $(V_u - V_l)_{max}$ is eventually stored in STORE 59. In a similar manner the lower eye boundary voltage corresponding to $(V_u - V_l)_{max}$ is placed in STORE 61. These eye boundary voltages are then summed in summing amplifier 41 as heretofore described.

The phase indexor 26 generates a distinct analogue voltage for each of the states or phases thereof. Hence, as the phase indexor is sequenced as described, distinct analogue phase voltages are delivered to the STORE 62. The AND gate 64 is periodically enabled along with the AND gates 58 and 68 with the result that the analogue phase voltage corresponding to $(V_u - V_l)_{max}$ is eventually stored in store 66. This voltage is subsequently delivered to HOLD 46 via the AND gate 44.

The storage in STORES 59, 61, 62 and 66 is a destructive one and each new piece of information destroys that previously stored. The pulse from phase indexor 26 marking the end of a phase index cycle is used to clear HOLD 55 in preparation for the next eye examination.

It should be understood that the foregoing disclosure relates to only a preferred embodiment of the invention and that numerous modifications and alterations may be made therein without departing from the spirit and scope of the invention.

What is claimed is:

1. In a digital data transmission system which includes automatic voltage threshold level selections and signal-eye sampling times, wherein the signal-eyes are defined by the ensemble of all possible digital data code combinations at a code interpretation point, with each signal-eye having eye boundaries that include at least one maximum eye opening, which system is characterized by means for determining the boundaries of the signal-eyes defined by the ensemble of all possible digital data code combinations at a code interpretation point, means operative in response to the first-recited means for determining the maximum eye openings along the voltage axis, means responsive to the maximum eye opening determining means for setting the voltage threshold levels midway between the extremes of the eye boundary openings, and means for adjusting sampling times to coincide with the times of maximum eye openings.

2. Apparatus as defined in claim 1 wherein the eye boundary determining means comprises means for sampling the digital data at a predetermined time in each time slot over an extended interval, means for comparing the data signal samples with a given reference voltage, means for respectively counting and then comparing the number of signal samples that occur above and below said reference voltage, and means for increasing said reference voltage in quantum steps in response to the count comparison until said reference voltage approximates the eye boundary at the particular predetermined time.

3. Apparatus as defined in claim 2 wherein the polarity of the reference voltage is reversed after an eye boundary has been approximated, whereby the upper and lower boundaries are both determined.

4. Apparatus as defined in claim 3 including means for phase incrementing the sampling time a given amount after each determination of an upper and lower eye boundary has been carried out.

5. Apparatus as defined in claim 4 wherein the sampling time is successively incremented throughout a predetermined portion of said time slot and then recycled to the initial time slot sampling instant.

6. Apparatus as defined in claim 5 wherein said extended interval is sufficiently long that the probability of occurrence of all possible digital data codes is statistically high.

7. Apparatus as defined in claim 6 wherein said means for determining the maximum eye openings comprises means for successively storing the voltage magnitudes of the upper and lower eye boundaries for each of the incremental sampling times, means for algebraically subtracting the voltage of each lower boundary from the voltage of the upper boundary, and means for comparing the results of successive subtractions to arrive at the maximum value thereof.

References Cited

UNITED STATES PATENTS

| | | | |
|---|---|---|---|
| 2,841,649 | 7/1958 | Boisvieux | 328—119 XR |
| 3,214,700 | 10/1965 | Hook | 328—147 |
| 3,404,232 | 10/1968 | Burford | 328—162 XR |

JOHN S. HEYMAN, Primary Examiner

J. ZAZWORSKY, Assistant Examiner

U.S. Cl. X.R.

178—70; 307—235; 328—151, 163